(12) United States Patent
Cohen et al.

(10) Patent No.: US 10,535,011 B2
(45) Date of Patent: Jan. 14, 2020

(54) PREDICTING CAPACITY BASED UPON DATABASE ELEMENTS

(71) Applicant: International Business Machines Corporation, Armonk, NY (US)

(72) Inventors: Ofir D. Cohen, Haifa (IL); Sagy Erlichman, Tel-Aviv (IL); Rotem Klein, Kiryat Ono (IL); Dan Ravid, Givataim (IL); Moshe Weiss, Petah Tiqwa (IL)

(73) Assignee: International Business Machines Corporation, Armonk, NY (US)

( * ) Notice: Subject to any disclaimer, the term of this patent is extended or adjusted under 35 U.S.C. 154(b) by 640 days.

(21) Appl. No.: 14/806,879

(22) Filed: Jul. 23, 2015

(65) Prior Publication Data
US 2017/0024654 A1 Jan. 26, 2017

(51) Int. Cl.
*G06N 7/00* (2006.01)
*G06F 3/06* (2006.01)

(52) U.S. Cl.
CPC .......... *G06N 7/005* (2013.01); *G06F 3/0604* (2013.01); *G06F 3/0653* (2013.01); *G06F 3/0683* (2013.01)

(58) Field of Classification Search
CPC ..... G06N 7/005; G06F 3/0604; G06F 3/0683; G06F 3/0653
See application file for complete search history.

(56) References Cited

U.S. PATENT DOCUMENTS

| 8,326,793 | B1 * | 12/2012 | Bowers | G06F 9/50 706/45 |
| 8,332,860 | B1 * | 12/2012 | Yahalom | G06F 3/0605 709/226 |
| 8,447,937 | B2 | 5/2013 | Maruyama et al. | |
| 8,560,671 | B1 * | 10/2013 | Yahalom | H04L 67/1097 709/224 |
| 8,694,727 | B2 | 4/2014 | Naganuma et al. | |
| 8,874,861 | B2 | 10/2014 | Takashima | |

(Continued)

FOREIGN PATENT DOCUMENTS

KR 101403417 B1 5/2014

OTHER PUBLICATIONS

Hua, et al., "SmartStore: A New Metadata Organization Paradigm with Semantic-Awareness for Next-Generation File Systems", SC '09, Nov. 14-20, 2009, Copyright 2009 ACM, 12 pages.

(Continued)

*Primary Examiner* — Kakali Chaki
*Assistant Examiner* — Ababacar Seck
(74) *Attorney, Agent, or Firm* — Bryan D. Wells

(57) ABSTRACT

The method includes identifying, by one or more computer processors, a grouping of elements in a storage system. The method further includes identifying, by one or more computer processors, a first element from the identified grouping of elements. The method further includes identifying, by one or more computer processors, a root unit of the first element from the identified grouping of elements. The method further includes determining, by one or more computer processors, a past usage history of computer resources for the identified root unit of the first element. The method further includes calculating, by one or more computer processors, a future usage of computer resources for the identified root unit based upon the determined past usage history.

20 Claims, 3 Drawing Sheets

(56) References Cited

U.S. PATENT DOCUMENTS

| | | | |
|---|---|---|---|
| 2002/0156891 A1* | 10/2002 | Ulrich | G06F 17/30067 |
| | | | 709/225 |
| 2008/0049614 A1* | 2/2008 | Briscoe | H04L 41/0806 |
| | | | 370/230 |
| 2011/0252134 A1 | 10/2011 | Villeneuve et al. | |
| 2015/0039753 A1 | 2/2015 | Zink et al. | |
| 2016/0092465 A1* | 3/2016 | Dornquast | H04L 67/1072 |
| | | | 706/12 |

OTHER PUBLICATIONS

Zeng, et al., "Research on Cloud Storage Architecture and Key Technologies", ICIS 2009, Nov. 24-26, 2009, Copyright 2009 ACM, pp. 1044-1048.

"Test Exit Letter: IBM XIV Management Tools v4.4", Jul. 30, 2014, 2 pages.

* cited by examiner

PREDICTING CAPACITY BASED UPON DATABASE ELEMENTS

BACKGROUND

The present invention relates generally to storage capacity, and more particularly to creating a projection of future storage capacity based on base elements.

Computer data storage, often called storage or memory, is a technology consisting of computer components and recording media used to retain digital data. Computer data storage is a core function and fundamental component of computers.

The central processing unit (CPU) of a computer is what manipulates data by performing computations. In practice, almost all computers use a storage hierarchy, which puts fast but expensive and small storage options close to the CPU and slower but larger and cheaper options farther away. Often the fast, volatile technologies (which lose data when powered off) are referred to as "memory," while slower, permanent technologies are referred to as "storage," but these terms are often used interchangeably.

Without a significant amount of memory, a computer would merely be able to perform fixed operations and immediately output the result. A computer would have to be reconfigured to change behavior. Fixed operation behavior is acceptable for devices, such as desk calculators, digital signal processors, and other specialized devices.

SUMMARY

Embodiments of the present invention disclose a method, computer program product, and system for predicting storage capacity. In one embodiment, in accordance with the present invention, the computer-implemented method includes identifying, by one or more computer processors, a grouping of elements in a storage system. The method further includes identifying, by one or more computer processors, a first element from the identified grouping of elements. The method further includes identifying, by one or more computer processors, a root unit of the first element from the identified grouping of elements. The method further includes determining, by one or more computer processors, a past usage history of computer resources for the identified root unit of the first element. The method further includes calculating, by one or more computer processors, a future usage of computer resources for the identified root unit based upon the determined past usage history.

DETAILED DESCRIPTION

Embodiments of the present invention recognize that creating data capacity projections based on high-level elements (e.g., elements which can be further broken into smaller elements) of a grouping (e.g., a pool which is made up of one or more elements, sub elements, base elements, etc.) can lead to vast differentiations based upon the addition or removal of base elements (e.g., the smallest unit, also known as a root unit, wherein the base element cannot be broken into smaller elements). Embodiments of the present invention recognize that migration of elements from one pool to another can create large differentials in data capacity projections.

Implementation of embodiments of the invention may take a variety of forms, and exemplary implementation details are discussed subsequently with reference to the Figures.

Figure 1:
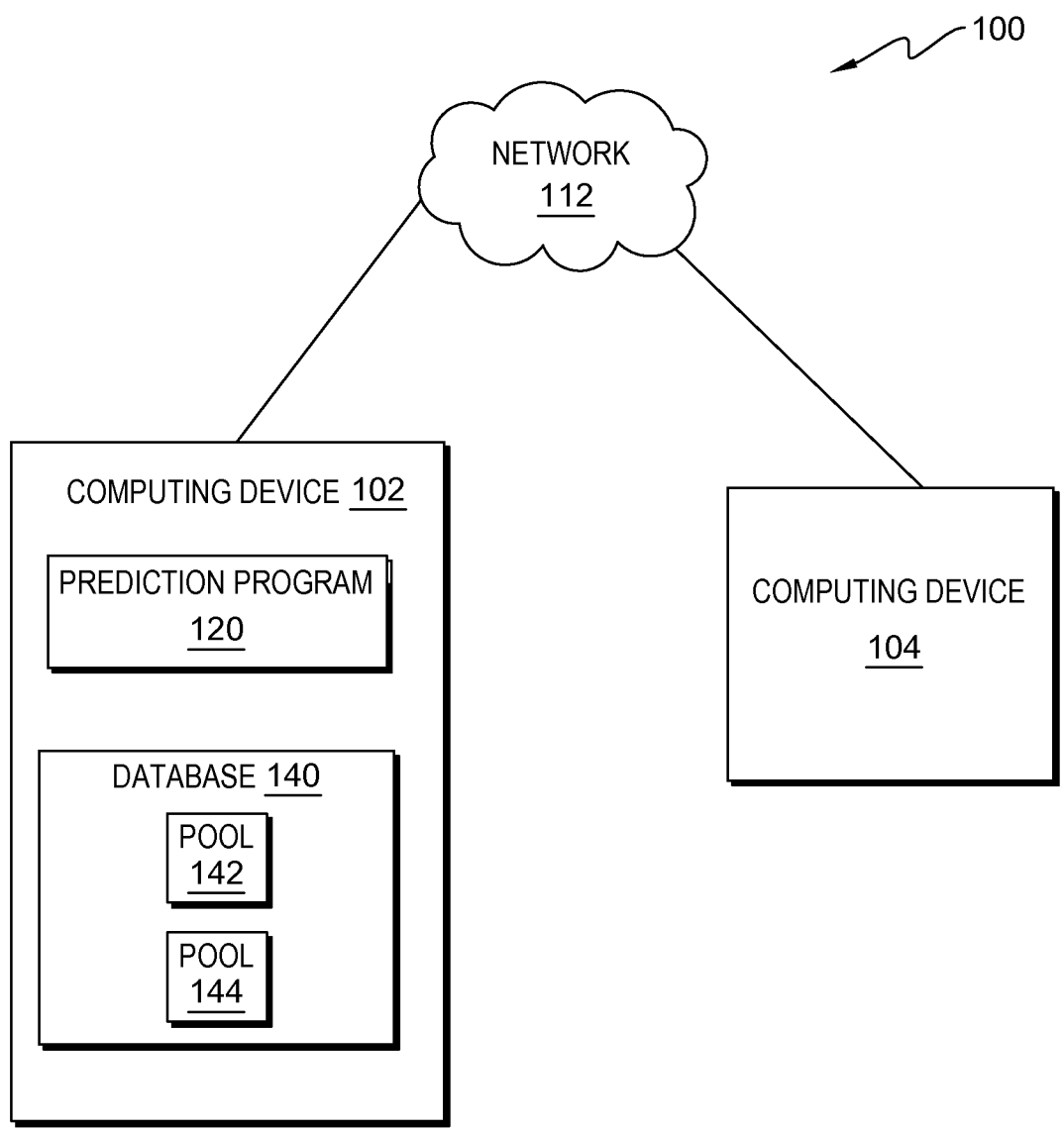
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 102 and computing device 104 interconnected over network 112. Network 112 represents, for example, a telecommunications network, a local area network (LAN), a wide area network (WAN), such as the Internet, or a combination of the three, and includes wired, wireless, and/or fiber optic connections. Network 112 includes one or more wired and/or wireless networks that are capable of receiving and transmitting data, voice, and/or video signals, including multimedia signals that include voice, data, and video information.

In the depicted environment, computing device 102 is one or more of a management server, a web server, or any other electronic device or computing system capable of receiving, analyzing, and sending data. In this embodiment, computing device 102 creates a projection of future storage capacity based on base elements. In other embodiments, computing device 102 represents a server computing system utilizing multiple computers as a server system, such as in a cloud computing environment. In another embodiment, computing device 102 represents a laptop computer, a tablet computer, a netbook computer, a personal computer (PC), a desktop computer, a personal digital assistant (PDA), a smart phone, or any programmable electronic device capable of communicating with computing device 104 and any other computing device (not depicted) via network 112. In another embodiment, computing device 102 represents a computing system utilizing clustered computers and components to act as a single pool of seamless resources. Computing device 102 may include components, as depicted and described in further detail with respect to FIG. 3, in accordance with embodiments of the present invention. Computing device 102 includes prediction program 120 and database 140.

In depicted distributed data processing environment 100, prediction program 120 resides on computing device 102 and creates a projection of future storage capacity based on base elements. In various embodiments, prediction program 120 determines the base elements that make up a pool and creates a projection of the pools future resource usage based on the past history of the base elements. In an example, computing device 102 may have 10 gigabytes of capacity. Prediction program 120 identifies all elements on computing device 104 at the lowest level to determine past and present capacity usage. Prediction program 120 can then generate a prediction of future usage based upon the past and present usage of all elements. In another example, prediction program 120 may separate elements into various groups or pools and generate predictions for future capacity based upon each pool. In some embodiments, prediction program 120 may reside on another computing device (e.g., computing device 104) and access database 140 via network 112. In other embodiments, prediction program 120 may include subprograms, which identify all elements that create a pool or calculate predicted future capacity. Prediction program 120 is depicted and described in further detail with respect to FIG. 2.

In the depicted embodiment, database 140 resides on computing device 102. In another embodiment, database 140 may reside elsewhere in distributed data processing environment 100, such as within computing device 104 or independently as a standalone database that is capable of communicating with computing device 102 and/or computing device 104 via network 112. A database is an organized collection of data. Database 140 is implemented with any type of storage device capable of storing data that is accessed and utilized by computing device 102 and computing device 104, such as a database server, a hard disk drive, or a flash memory. In other embodiments, database 140 represents multiple storage devices within computing device 102. Database 140 stores information, such as pools, groups, elements, base elements, the volume for an element or base element, past capacity predictions, and available capacity. Database 140 includes pools 142 and 144.

In depicted distributed data processing environment 100, pools 142 and 144 reside on database 140 and are pools of elements. In some embodiments, pools 142 and 144 include a group of elements. The group of elements that make up a pool may be combined by a user of computing device 102, prediction program 120, or another program (not depicted) in distributed data processing environment 100. Pools 142 and 144 may be a collection of similar elements that are grouped together based on past or present usage rates. Usage rates may also be referred to as capacity.

In the depicted embodiment, computing device 104 is one or more of a desktop computer, a laptop computer, a tablet computer, a specialized computer server, a smart phone, or any programmable electronic device capable of communicating with computing device 102 via network 112 and with various components and devices within distributed data processing environment 100. In general, computing device 104 represents any programmable electronic device or combination of programmable electronic devices capable of executing machine readable program instructions and communicating with other computing devices via a network, such as network 112. Computing device 104 may include components, as depicted and described in further detail with respect to FIG. 3, in accordance with embodiments of the present invention. In an embodiment, computing device 104 may access prediction program 120 to identify capacity predictions or send additional data to prediction program 120.

Figure 2:
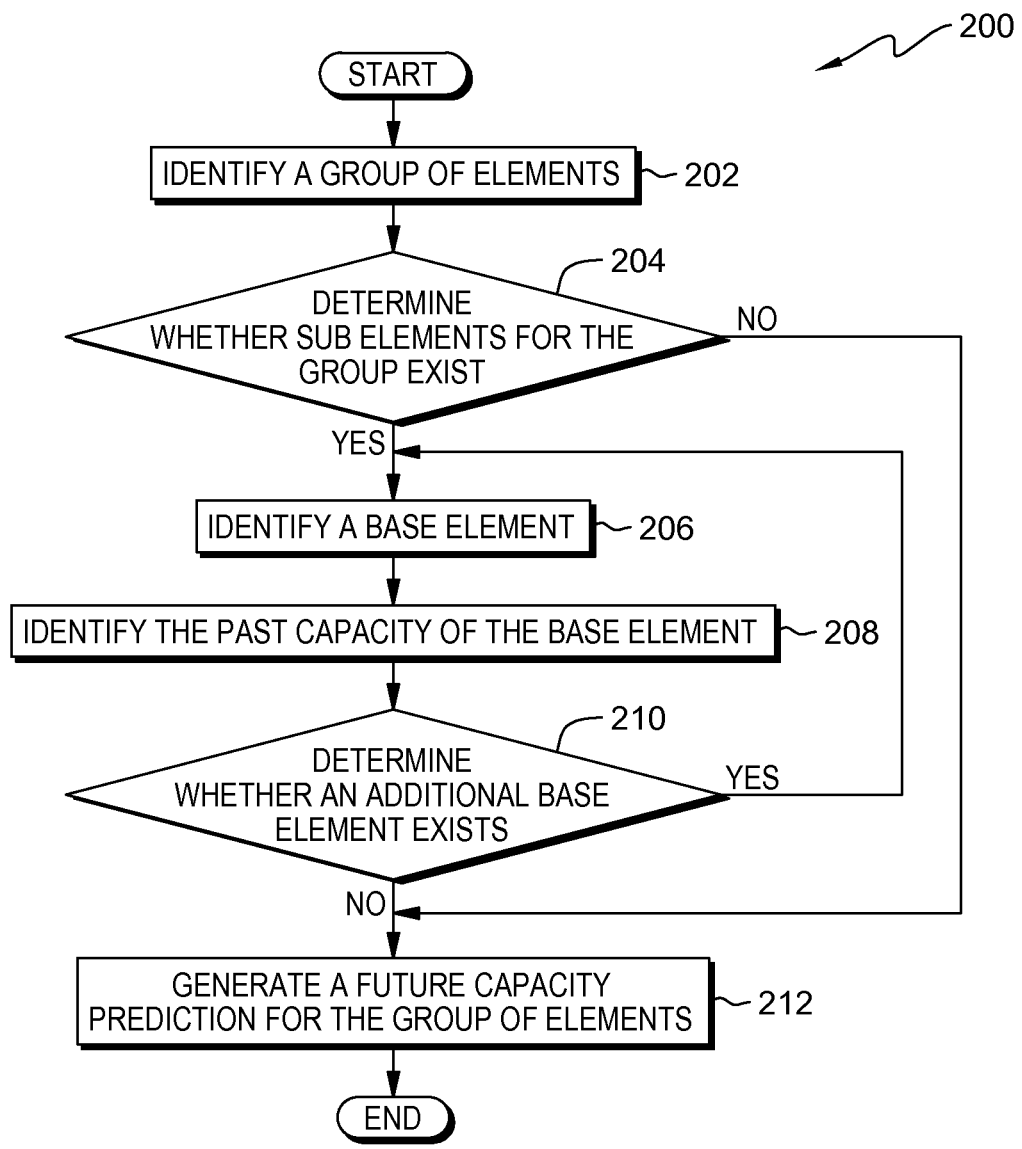
FIG. 2 is a flowchart depicting operational steps of a program for creating a projection of future storage capacity based on base elements within the distributed data processing environment of FIG. 1, in accordance with an embodiment of the present invention.

FIG. 2 is a flowchart depicting operational steps of program 200, which is a function of prediction program 120, in accordance with an embodiment of the present invention. Program 200 operates on computing device 102 and creates a projection of future storage capacity based on base elements. In various embodiments, program 200 may initiate in response to receiving a prompt from a user of prediction program 120. In another embodiment, the operational steps of program 200 may initiate upon an inclusion or deletion of a new element in a pool. In one embodiment, program 200 may begin the operational steps for program 200 at preset time intervals.

Program 200 identifies a group of elements (step 202). In various embodiments, program 200 identifies a pool, such as pool 142. In an example, program 200 identifies a grouping of elements, also known as a pool, located on a computing device (e.g., computing device 102). In various embodiments, groups of elements may be created and formed by users of a computing device (e.g., computing device 102). In other embodiments, various programs (not depicted) or databases (not depicted) may create and/or store elements in pools. In an example, computing device 102 stores data and usage information related to an application located on computing device 102 under the same key. Program 200 identifies the group of elements related to the application. In other embodiments, program 200 identifies a group of elements based upon the data indicating a user request for future capacity usage for specific elements. In an example, program 200 receives data requesting program 200 to predict future capacity usage based upon a user provided list of elements. In this example, program 200 identifies a group of elements based upon the list of elements received. For the purposes of this application, high-level elements that comprise a group of elements are referred to as prime elements.

Program 200 determines whether sub elements for the group exist (decision 204). In various embodiments, program 200 identifies elements of the identified group of elements. Program 200 determines if sub elements make up the previously identified elements that make up the group. In an example, program 200 identifies a specific element in the group of elements. Program 200 then determines if the specific element can be broken into sub elements, or if the specific element stands alone as a singular element. In another example, program 200 is determining a future capacity usage for database 140. Program 200 identifies pools 142 and 144 as two elements in database 140. Program 200 then determines if pools 142 and 144 are singular elements, or if pools 142 and 144 can be further divided into sub elements.

If program 200 determines that sub elements for the group exist (yes branch, decision 204), then program 200 identifies a base element (step 206). In various embodiments, program 200 may identify a sub element for a first identified element. First identified elements can be referred to as prime elements. In an example, program 200 determines that an element is comprised of more than one sub element. In another example, element A is comprised of sub elements 1 through 5 (not depicted). For each new sub element, program 200 determines if the sub element has further sub elements until a base element is identified. A base element is the lowest unit that comprises a group of elements. For example, program 200 further determines that sub element 1 is comprised of further sub elements x, y, and z. Sub elements x, y, and z are base elements because no other sub elements create x, y, and z. In various embodiments, a base element can also be referred to as a root element or root unit. For example, element A is comprised of sub elements 1 through 5, and sub element 1 is comprised of further sub elements x, y, and z. In this example, the elements are arranged in a hierarchy (e.g., a tree structure), where sub elements x, y, and z are the root units (or root elements) of sub element 1, because sub elements x, y, and z are not comprised of any additional sub elements.

In another example, program 200 identifies a group of elements A-F in pool 142. Program 200 then determines that element A is comprised of sub elements 1-5. Program 200 further determines that sub element 1 is comprised of base elements x, y, and z. In one example, program 200 further identifies that sub elements 2-5 are base elements. Program 200 identifies all base elements for element A as base elements x, y, z, 2, 3, 4, and 5.

In various embodiments, base elements may be labeled or described by users of prediction program 120. In an example, various elements may have a hierarchy, which is created by a user. For example, a system or domain may be the largest element, which consists of pool, which further consists of capacity. In other embodiments, different nomenclature or identifications may specify elements. In various embodiments, each element of like kind may have a similar identification or tag that enables program 200 to identify the type of element. In an example, program 200 identifies base elements based upon a preset user identification in the name of the element.

In some embodiments, program 200 creates a hierarchy of elements. In an example, program 200 may identify a prime element as the largest element, which is comprised of further smaller sub elements. Program 200 may create a tree structure breaking down the elements until a base element, also known as a root element or root unit, is reached for all prime elements.

Program 200 identifies the past capacity of the identified base element (step 208). In various embodiments, program 200 identifies the past capacity for each identified base element that comprises a prime element (e.g., or each root unit/root element in the hierarchy). In an example, program 200 identifies the amount of storage capacity each identified base element utilizes before the operational steps of FIG. 2 began (i.e., the past capacity). In one example, base element x may have previously been a part of a different prime element or in a different group. Program 200 still identifies the past capacity usage for base element x as the usage requirements generally do not change drastically even if an element migrates from one group to another group. In some embodiments, program 200 identifies all historical capacity data that is associated with each element, sub element, and base element. Historical capacity data may be stored in a database, such as database 140, or associated with the actual elements as metadata. In embodiment, a base element may have been designated in another group of elements previously and recently migrated to the new group of elements (e.g., an element moved from pool 142 to pool 144). The recently migrated base element may contain metadata regarding past capacity usage. In an example, base element x is located in pool 142. Base element x is migrated to pool 144 when element A is migrated to pool 144. Program 200 identifies the past usage for base element x regardless of the group in which base element x is located, as the usage rate for the base element should not change due to the migration.

Program 200 determines whether an additional base element exists (decision 210). In various embodiments, program 200 determines whether more base elements exist (e.g., or more root unit/root element in the hierarchy). In an example, program 200 identifies all base elements for prime element A, and then determines if sub units exist for the next prime element, such as prime element B. In some example, program 200 may identify each prime element in a group of elements and then determine if base elements have been identified for each prime element. In some embodiments, program 200 may identify base elements for each prime element and then identify another prime element that may contain base elements.

If program 200 determines that an additional base element exists (yes branch, decision 210), then program 200 identifies the base element (step 206). In various embodiments, program 200 may identify a sub element for a prime element. In an example, program 200 determines that an element is comprised of more than one sub element. In another example, element A is comprised of sub elements 1 through 5 (not depicted). For each new sub element, program 200 determines if the sub element has further sub elements until a base element (or root element) is identified. A base element is the lowest unit that comprises a group of elements. For example, program 200 further determines that sub element 1 is comprised of further sub elements x, y, and z. Sub elements x, y, and z are base elements (also referred to as root units) because no other sub elements create x, y, and z.

In another example, program 200 identifies a group of elements A-F in pool 142. Program 200 then determines that element A is comprised of sub elements 1-5. Program 200 further determines that sub element 1 is comprised of base elements x, y, and z. In one example, program 200 further identifies that sub elements 2-5 are base elements. Program 200 identifies all base elements for element A as base elements x, y, z, 2, 3, 4, and 5. In another embodiment, program 200 refers to elements x, y, z, 2, 3, 4, and 5 as the "root units" of element A.

If program 200 determines that sub elements for the group do not exist (no branch, decision 204), then program 200 generates a future capacity prediction for the group of elements (step 212). In various embodiments, program 200 generates capacity predictions for a group of elements based upon the past usage of the identified base elements which comprise the group of elements. In an example, program 200 utilizes each identified past capacity of the base elements to create a future prediction based upon the past history of the usage for each base element. In multiple embodiments, program 200 generates capacity predictions by plotting the capacity usage over time. Program 200 may plot capacity usage over time for each identified base element in a group of elements by utilizing the identified past history for each base element. Once program 200 has plotted the capacity over time for each base element, program 200 may then add the base elements to plot the total capacity over time. Program 200 may create a future prediction of capacity usage by creating an average of the total capacity usage over time.

In an embodiment, if a base element or any higher element is migrated to another pool (e.g., migrate from pool 142 to pool 144), program 200 would not include the migrated element history when calculating future capacity predictions for pool 142. Conversely, program 200 would include the migrated element history when calculating the future capacity prediction for pool 144.

If program 200 determines that additional base elements do not exist, (no branch, decision 210), then program 200 generates capacity predictions for the group of elements (step 212). In various embodiments, program 200 generates capacity predictions for a group of elements based upon the past usage of the identified base elements which comprise the group of elements. In an example, program 200 utilizes each identified past capacity of the base elements to create a future prediction based upon the past history of the usage for each base element. In multiple embodiments, program 200 generates capacity predictions by plotting the capacity usage over time. Program 200 may plot capacity usage over time for each identified base element in a group of elements by utilizing the identified past history for each base element. Once program 200 has plotted the capacity over time for each base element, program 200 may then add the base elements to plot the total capacity over time. Program 200 may create a future prediction of capacity usage by creating an average of the total capacity usage over time. In another example, program 200 may utilize linear regression or another means known by one skilled in the art to generate future capacity predictions.

In an embodiment, if a base element or any higher element is migrated to another pool (e.g., migrate from pool 142 to pool 144), program 200 would not include the migrated element history when calculating future capacity predictions for pool 142. Conversely, program 200 would include the migrated element history when calculating the future capacity prediction for pool 144.

Figure 3:
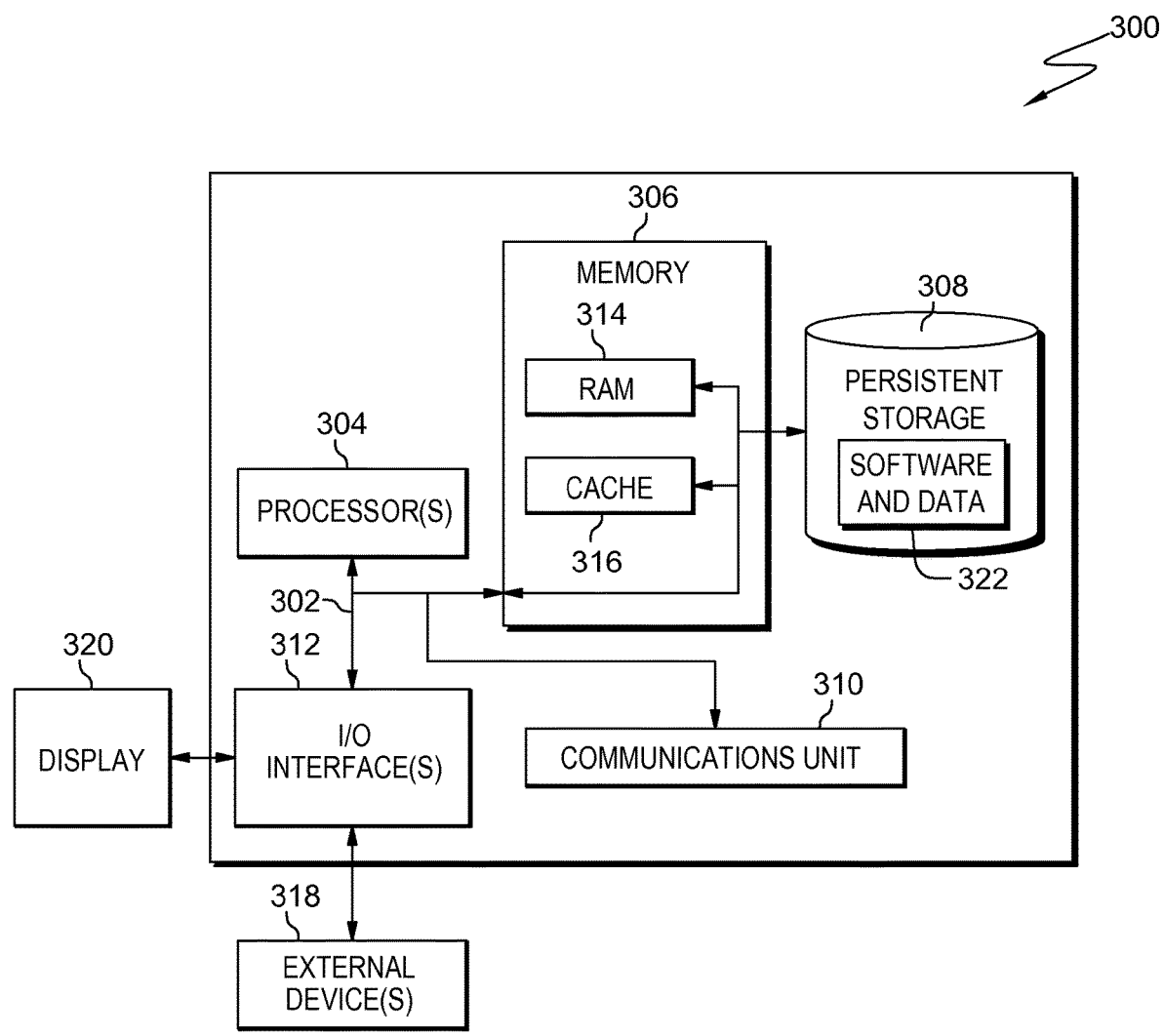
FIG. 3 depicts a block diagram of components of computing devices of FIG. 1, in accordance with an embodiment of the present invention.

FIG. 3 depicts a block diagram of components of computer 300, which is representative of computing device 102 and computing device 104, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made. In an example, program 200 calculates each prime element as an aggregation of base element capacity samples. In some embodiments, each prime element, aside from the base elements of the prime element, is sampled and displayed on a graph depicting usage history.

Computer 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications, and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache 316. In general, memory 306 can include any suitable volatile or non-volatile computer readable storage media. Software and data 322 are stored in persistent storage 308 for access and/or execution by processor(s) 304 via one or more memories of memory 306. With respect to computing device 102, software and data 322 represents prediction program 120 and database 140.

In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Software and data 322 may be downloaded to persistent storage 308 through communications unit 310.

I/O interface(s) 312 allows for input and output of data with other devices that may be connected to computer 300. For example, I/O interface(s) 312 may provide a connection to external device(s) 318, such as a keyboard, a keypad, a touch screen, and/or some other suitable input device. External device(s) 318 can also include portable computer readable storage media, such as, for example, thumb drives, portable optical or magnetic disks, and memory cards. Software and data 322 can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for predicting storage capacity, the method comprising:
   changing a composition of elements of a data storage system that includes a plurality of elements of respective storage element types;
   in response to changing the composition of the data storage system, modeling, based on a hierarchy of storage element types, the data storage system;
   classifying, based on the modeled data storage system and the hierarchy of storage element types, each element of the data storage system that is not a sub element of an element of a different storage element type as a prime element, wherein an instance of a sub element is an instance of a dependent element of a lower storage element type within the hierarchy of storage element types of the modeled data storage system;
   classifying, based on the modeled data storage system and the hierarchy of storage element types, each element of the data storage system that has no sub element of another storage element type as a root element, wherein:
      an instance of a prime element is identified as an instance of a root element if the instance of the prime element has no dependent sub element;
      an instance of a sub element of a prime element is identified as an instance of a root element if the instance of the sub element has no dependent sub element; and
      an instance of a sub element of a sub element is identified as an instance of a root element if the instance of a sub element of a sub element has no dependent sub element;
   for each root element, identifying one or more capacity utilization values based on historical capacity data corresponding to respective root elements; and generating a future capacity projection for the data storage system based on a summation of the one or more capacity utilization values identified for each root element.

2. The method of claim 1, wherein no other historical capacity data other than the historical capacity data corresponding to root elements is used to generate the future capacity projection for the data storage system.

3. The method of claim 2, wherein the future capacity projection for the data storage system is generated based on an assumption that capacity utilization of one or more root elements is substantially similar when the one or more root elements are migrated between data storage systems.

4. The method of claim 1, the method further comprising:
responsive to migrating a selected root element from a first data storage system to a second data storage system, excluding one or more capacity utilization values corresponding to the selected root element from data used to generate a future capacity projection for the first data storage system.

5. The method of claim 4, the method further comprising:
responsive to migrating the selected root element from the first data storage system to the second data storage system, including the one or more capacity utilization values corresponding to the selected root element from data used to generate a future capacity projection for the second data storage system.

6. The method of claim 5, wherein the first data storage system is a first pool of data storage devices, the second data storage system is a second pool of data storage devices, and the selected root element is of a same storage element type within the hierarchy of storage element types as root elements representing the first pool of data storage devices and the second pool of data storage devices.

7. The method of claim 1, wherein a new model of the data storage system is created and a new future capacity projection for the data storage system is generated when any root element is added to or removed from the data storage system.

8. The method of claim 1, wherein one or more first root elements are elements of a first storage element type and one or more second root elements are elements of a second storage element type.

9. A computer program product for predicting storage capacity, the computer program product comprising:
one or more computer readable storage media and program instructions stored on the one or more computer readable storage media, the program instructions comprising:
program instructions to change a composition of elements of a data storage system that includes a plurality of elements of respective storage element types;
program instructions to model, based on a hierarchy of storage element types, the data storage system in response to changing the composition of the data storage system;
program instructions to classify, based on the modeled data storage system and the hierarchy of storage element types, each element of the data storage system that is not a sub element of an element of a different storage element type as a prime element, wherein an instance of a dependent element is an instance of a dependent element of a lower storage element type within the hierarchy of storage element types of the modeled data storage system;
program instructions to classify, based on the modeled data storage system and the hierarchy of storage element types, each element of the data storage system that has no sub element of another storage element type as a root element, wherein:
an instance of a prime element is identified as an instance of a root element if the instance of the prime element has no dependent sub element;
an instance of a sub element of a prime element is identified as an instance of a root element if the instance of the sub element has no dependent sub element; and
an instance of a sub element of a sub element is identified as an instance of a root element if the instance of a sub element of a sub element has no dependent sub element;
program instructions to, for each root element, identify one or more capacity utilization values based on historical capacity data corresponding to respective root elements; and
program instructions to generate a future capacity projection for the data storage system based on a summation of the one or more capacity utilization values identified for each root element.

10. The computer program product of claim 9, wherein no other historical capacity data other than the historical capacity data corresponding to root elements is used to generate the future capacity projection for the data storage system.

11. The computer program product of claim 10, wherein the future capacity projection for the data storage system is generated based on an assumption that capacity utilization of one or more root elements is substantially similar when the one or more root elements are migrated between data storage systems.

12. The computer program product of claim 9, the program instructions further comprising:
program instructions to, responsive to migrating a selected root element from a first data storage system to a second data storage system, exclude one or more capacity utilization values corresponding to the selected root element from data used to generate a future capacity projection for the first data storage system.

13. The computer program product of claim 12, the program instructions further comprising:
program instructions to, responsive to migrating the selected root element from the first data storage system to the second data storage system, include the one or more capacity utilization values corresponding to the selected root element from data used to generate a future capacity projection for the second data storage system.

14. The computer program product of claim 13, wherein the first data storage system is a first pool of data storage devices, the second data storage system is a second pool of data storage devices, and the selected root element is of a same storage element type within the hierarchy of storage element types as root elements representing the first pool of data storage devices and the second pool of data storage devices.

15. A computer system for predicting storage capacity, the computer system comprising:
one or more computer processors;
one or more computer readable storage media;

program instructions stored on the computer readable storage media for execution by at least one of the one or more computer processors, the program instructions comprising:
- program instructions to change a composition of elements of a data storage system that includes a plurality of elements of respective storage element types;
- program instructions to model, based on a hierarchy of storage element types, the data storage system in response to changing the composition of the data storage system;
- program instructions to classify, based on the modeled data storage system and the hierarchy of storage element types, each element of the data storage system that is not a sub element of an element of a different storage element type as a prime element, wherein an instance of a sub element is an instance of a dependent element of a lower storage element type within the hierarchy of storage element types of the modeled data storage system;
- program instructions to classify, based on the modeled data storage system and the hierarchy of storage element types, each element of the data storage system that has no sub element of another storage element type as a root element, wherein:
  - an instance of a prime element is identified as an instance of a root element if the instance of the prime element has no dependent sub element;
  - an instance of a sub element of a prime element is identified as an instance of a root element if the instance of the sub element has no dependent sub element; and
  - an instance of a sub element of a sub element is identified as an instance of a root element if the instance of a sub element of a sub element has no dependent sub element;
- program instructions to, for each root element, identify one or more capacity utilization values based on historical capacity data corresponding to respective root elements; and
- program instructions to generate a future capacity projection for the data storage system based on a summation of the one or more capacity utilization values identified for each root element.

16. The computer system of claim 15, wherein no other historical capacity data other than the historical capacity data corresponding to root elements is used to generate the future capacity projection for the data storage system.

17. The computer system of claim 16, wherein the future capacity projection for the data storage system is generated based on an assumption that capacity utilization of one or more root elements is substantially similar when the one or more root elements are migrated between data storage systems.

18. The computer system of claim 15, the program instructions further comprising:
- program instructions to, responsive to migrating a selected root element from a first data storage system to a second data storage system, exclude one or more capacity utilization values corresponding to the selected root element from data used to generate a future capacity projection for the first data storage system.

19. The computer system of claim 18, the program instructions further comprising:
- program instructions to, responsive to migrating the selected root element from the first data storage system to the second data storage system, include the one or more capacity utilization values corresponding to the selected root element from data used to generate a future capacity projection for the second data storage system.

20. The computer system of claim 19, wherein the first data storage system is a first pool of data storage devices, the second data storage system is a second pool of data storage devices, and the selected root element is of a same storage element type within the hierarchy of storage element types as root elements representing the first pool of data storage devices and the second pool of data storage devices.

* * * * *